(No Model.)
G. A. BEACH.
CARRIAGE SPEAKING TUBE.
No. 386,053. Patented July 10, 1888.
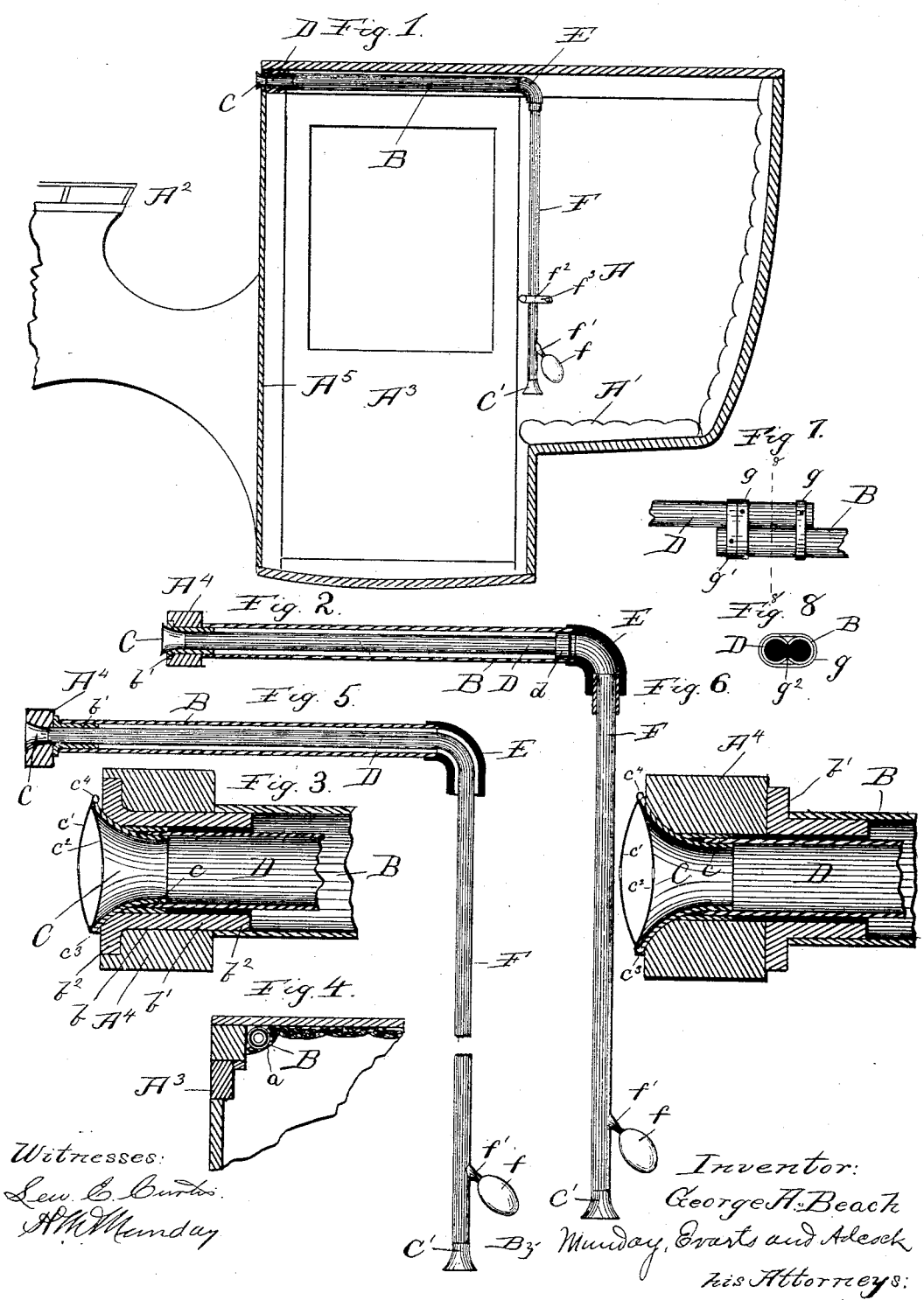

UNITED STATES PATENT OFFICE.

GEORGE A. BEACH, OF CHICAGO, ILLINOIS, ASSIGNOR OF ONE-HALF TO JAMES F. SOMES, OF SAME PLACE.

CARRIAGE SPEAKING-TUBE.

SPECIFICATION forming part of Letters Patent No. 386,053, dated July 10, 1888.

Application filed March 15, 1887. Serial No. 230,935. (No model.)

*To all whom it may concern:*

Be it known that I, GEORGE A. BEACH, a citizen of the United States, residing in Chicago, in the county of Cook and State of Illinois, have invented a new and useful Improvement in Carriage Speaking-Tubes, of which the following is a specification.

My invention relates to carriage speaking-tubes, and more particularly to improvements upon the carriage speaking-tube heretofore patented to me in Letters Patent No. 356,740.

The object of the present invention is to provide a carriage speaking-tube extending from the seat of the carriage to the driver's seat thereof, which may be contracted or telescoped out of the way, leaving no projecting part liable to injury or to affect the neat appearance of the carriage, and which will at the same time be of a more simple and cheap construction than that shown and described in my previous patent.

My present invention is only applicable to carriages, coupés, or other closed carriages or vehicles having rigid or non-folding bodies.

My invention consists in the novel devices and novel combinations of devices herein shown and described, and more particularly pointed out in the claim.

In the accompanying drawings, which form a part of this specification, and in which similar letters of reference indicate like parts, Figure 1 is a longitudinal sectional view of a closed carriage or vehicle embodying my invention, showing the speaking-tube in side elevation. Fig. 2 is an enlarged vertical longitudinal sectional view of the speaking-tube. Fig. 3 is an enlarged detail view showing the socket in which the driver's mouth-piece rests and in which it is concealed from view. Fig. 4 is a detail cross-section on line 4 4 of Fig. 1. Fig. 5 is a view similar to Fig. 2, showing a slight modification in the construction of the mouth-piece socket. Fig. 6 is an enlarged detail view of the construction disclosed in Fig. 5. Fig. 7 is an illustration of a modified construction of the sliding or telescoping tube, and Fig. 8 is a cross-section on line 8 8 of Fig. 7.

In said drawings, A represents a rigid or non-folding closed carriage-body, A' the carriage-seat, $A^2$ the driver's seat, and $A^3$ represents the door of the carriage. B represents the stationary or non-sliding tube or part of the speaking-tube extending from the front of the carriage-body or the vicinity of the driver's seat, under the top or roof of the carriage, and at one side thereof, as indicated clearly in Figs. 1 and 4. This tube B is preferably made of two or three ply rubber hose, or hose stiff enough to preserve its cylindrical shape. This tube B is supported at the corner of the carriage, as indicated at Fig. 4, preferably by the upholstery $a$. The upholstery thus serves to conceal the tube from view, as well as to support it. If preferred, straps or clips may also be used to support the tube in place. The driver's end of the tube is secured to and firmly supported by a thimble, $b'$, attached to the frame $A^4$ of the carriage-body. The thimble $b'$ is provided with a flange, $b^2$, and it preferably extends through a suitable hole, $b$, in the frame-piece $A^4$, the flange $b^2$ being countersunk in the frame, as indicated clearly in Figs. 2 and 3. The thimble $b'$ may, however, be secured to the frame, in the manner indicated in Fig. 6, by screws passing through the flange $b^2$. As indicated in Figs. 2 and 3, the thimble $b'$ constitutes the socket to receive and conceal from view the driver's mouth-piece C of the speaking-tube. The mouth-piece C is secured by a suitable flange, $c$, to a sliding or telescoping section or part, D, of the speaking-tube, which is preferably made of flexible hose, stiff enough, however, to be readily pushed back into the tube B after it has been drawn out. This tube D is of somewhat smaller diameter than the tube B, and should be provided with a shoulder or button enlargement, $d$, at its inner end, so that the friction thereof on the tube B will serve to retain the sliding tube D in its retracted position. The stationary tube B is provided with an elbow, E, at its inner end, to which a stationary tube, F, is attached, which extends down from the top of the carriage, at the side thereof, to the carriage-seat A'.

The section F may be attached to the elbow E in any suitable manner. The tube F is also preferably made of flexible-rubber hose, and is provided at its lower end with a mouth-piece, C', which is preferably made of soft or flexible rubber, stiff enough to preserve its shape when in use, but which will readily fold under pressure. The purpose of making this mouth-piece of soft or flexible rubber is to prevent injury or inconvenience to the person in the carriage-seat. The driver's mouth-piece C is provided with a hinged cap, $c'$, furnished with a whistle, $c^2$. This whistle is of an ordinary construction, and consists of two curved disks, $c'$ $c^2$, having opposite holes therein, the outer curved disk, $c'$, being also the cap-disk. The cap or disk $c'$ is provided with a flange, $c^3$, which fits the rim of the mouth-piece C. The hinge $c^4$ of this cap is or should be located at the top, so that the cap will depend from its hinge, and its gravity will thus serve to hold it closed, as well as the friction of the flange $c^4$ upon rim of the mouth-piece C. The tube F is further furnished near its lower end with a collapsible rubber bulb, $f$, connected to the tube by a suitable branch, $f'$, for operating the whistle. In operating the whistle by this collapsible air-pressure bulb the end of the tube F may be temporarily closed by collapsing the soft-rubber mouth-piece C' with the hand. The tube F extends down the side of the carriage, preferably in about the position indicated in the drawings, and is or may be secured in place by a strap and button, $f^2 f^3$. If preferred, also a portion or the whole of this tube F may be covered by the upholstery at the side of the carriage and concealed from view.

In the modification shown in Fig. 5 the tubes D and F, to which the mouth-pieces C C' are secured, are made in one continuous piece, and the stationary tube B serves simply as a guide in which the tube D and F slides or telescopes. In this construction the tube D F should be made long enough, so that when it is partially drawn out by the driver for use the mouth-piece C' will not be pulled too high for convenient use. In this construction the tube D F may be made of much lighter and more flexible hose, if desired, as the occupant of the carriage may pull the tube back just as the driver pulls it out.

In Figs. 5 and 6 the socket for the driver's mouth-piece C is shown as formed directly in the frame-piece $A^4$ of the carriage, instead of in the thimble $b'$. This construction of the socket in the frame-piece $A^4$ of the carriage serves equally well to conceal the mouth-piece of the speaking-tube from view externally and to protect it from injury.

In Figs. 7 and 8 the tube D fits outside the tube B, and is made to slide or telescope thereon by means of the bands or clips $g$ $g'$, the clips $g$ being secured to the movable tube, D, while the clips $g'$ are secured to the tube B, the tubes B D having openings $g^2$ through their contiguous walls, which register with each other when the tubes are extended or drawn out, as indicated in Fig. 7, and in the cross-section thereof in Fig. 8. The construction which I prefer to employ, however, is that shown in Figs. 1 and 2.

If desired, the mouth-piece C' may also be provided with a whistle or call, the same as the mouth-piece C.

The stationary tube or guide B may be secured to the vertical front wall, $A^5$, of the carriage-body, and extend vertically down from near the top corner of the carriage-body into convenient position to be reached from the carriage-seat A'; but in this construction the tube B is provided with the elbow E at its outer or upper end.

If desired, the tube D may be provided with a coil-spring inside the tube B for retracting the same.

I do not herein claim the combination of my carriage speaking-tube and the mouth-pieces thereof with their perforated hinged cap-disk provided with a second perforated disk to form a whistle, as shown and described, as that forms the subject of another or divisional application filed November 26, 1887, Serial No. 256,208.

I claim—

The combination, with a rigid or non folding closed carriage-body, of a telescoping or sliding speaking-tube, B D F, having mouth-pieces C C', the stationary tube or guide B, communicating with a hole or opening through the carriage-body, and the carriage-body being provided with a socket to receive and conceal said mouth-piece C, said tube D sliding or telescoping entirely within the carriage-body, substantially as specified.

GEO. A. BEACH.

Witnesses:
H. M. MUNDAY,
EDW. S. EVARTS.